April 6, 1926.
R. M. CRAIG
ADVERTISING SIGN
Original Filed Feb. 27, 1918   3 Sheets-Sheet 1
1,579,597
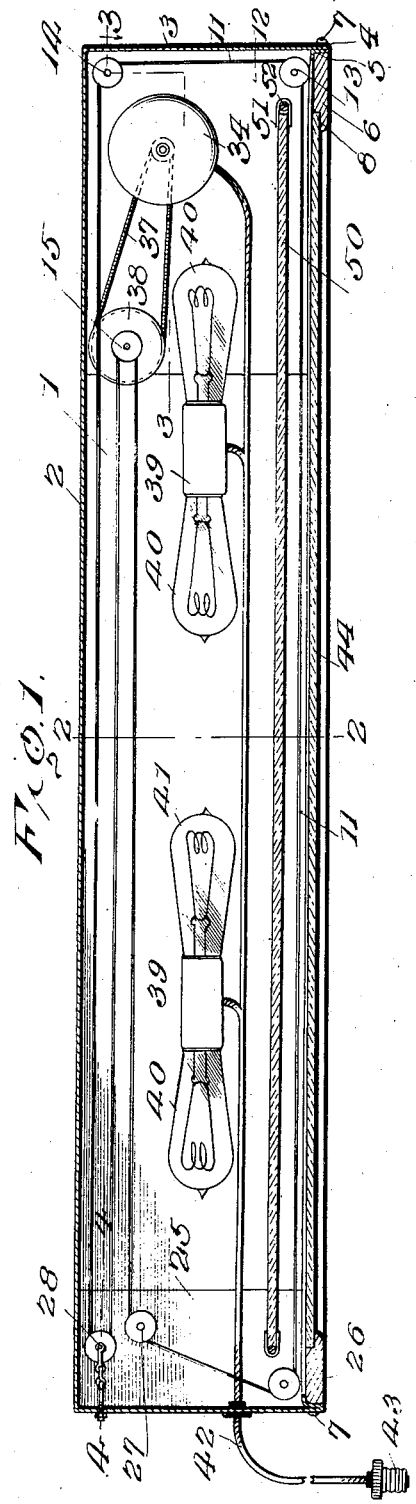
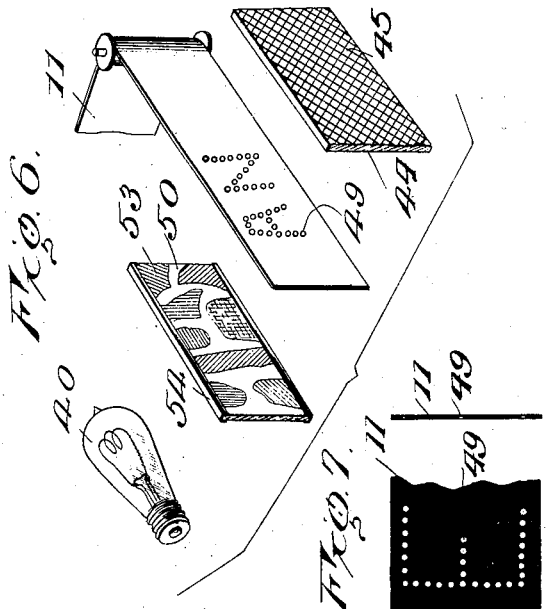
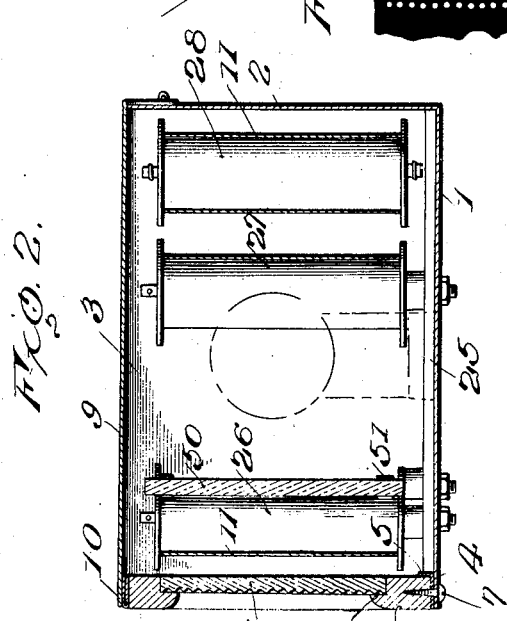
Inventor
R. M. Craig.
By
Lacey & Lacey, Attorneys April 6, 1926. 1,579,597
R. M. CRAIG
ADVERTISING SIGN
Original Filed Feb. 27, 1918 3 Sheets-Sheet 2
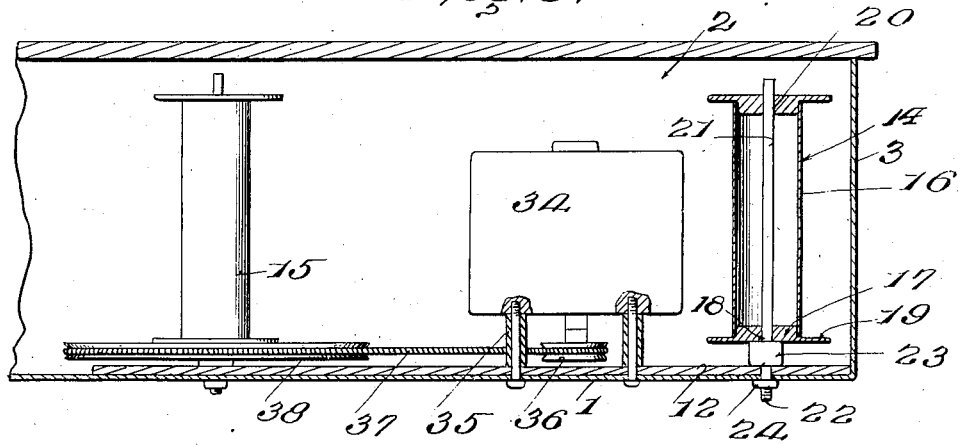
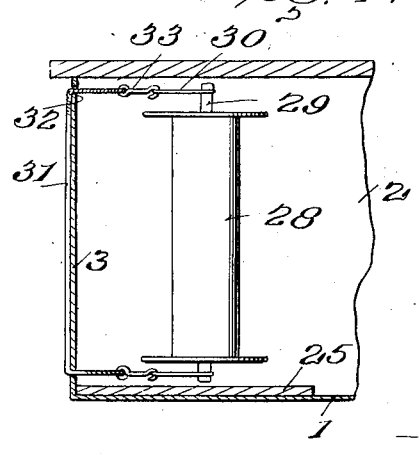
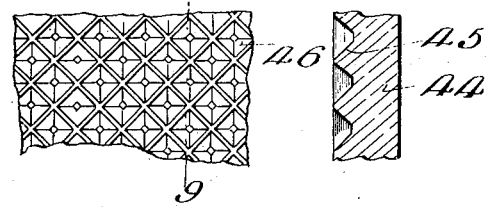
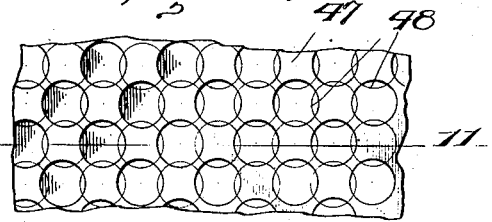
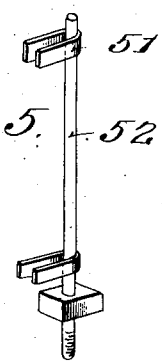
Inventor
R. M. Craig April 6, 1926. 1,579,597
R. M. CRAIG
ADVERTISING SIGN
Original Filed Feb. 27, 1918 3 Sheets-Sheet 3
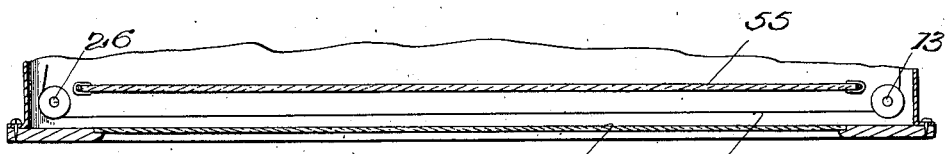
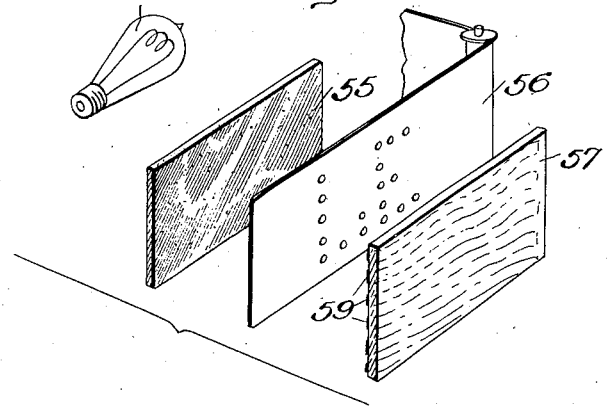
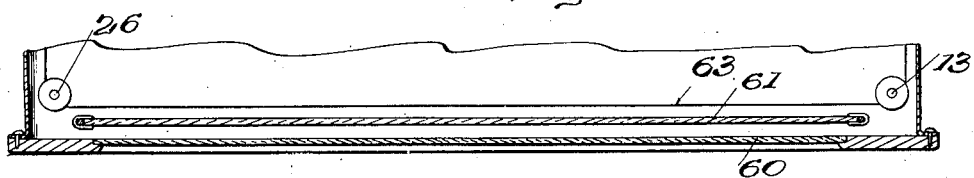
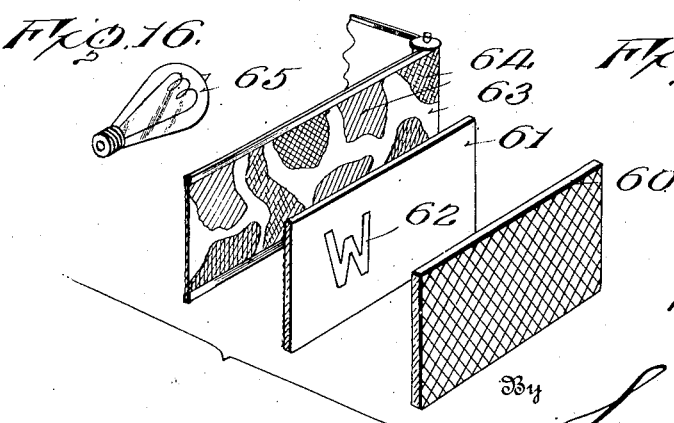
Inventor
R. M. Craig.
By Lacy & Lacy, Attorneys Patented Apr. 6, 1926.

1,579,597

UNITED STATES PATENT OFFICE.

RICHARD M. CRAIG, OF SAN ANTONIO, TEXAS.

ADVERTISING SIGN.

Application filed February 27, 1918, Serial No. 219,498. Renewed July 7, 1925.

*To all whom it may concern:*

Be it known that I, RICHARD M. CRAIG, a citizen of the United States, residing at San Antonio, in the county of Bexar and State of Texas, have invented certain new and useful Improvements in Advertising Signs, of which the following is a specification.

This invention relates to advertising signs and has as its primary aim to provide an advertising sign which will possess qualities rendering it particularly attractive to the eye and thereby greatly enhancing its value as an advertising medium. Light, color, and motion are factors extensively employed in the display of advertising matter for the reason that these factors attract and hold the attention of the observer and, consequently, attract attention to the advertising matter to be displayed. In some instances the sign characters are successively displayed through the medium of light rays by alternately flashing the illuminating means on and off and in other instances the sign characters are illuminated alternately by different colored light rays. In such instances there is, of course, a certain semblance of motion and the characters are illuminated either by white light or colored light. However, the operation of such a sign comprehends nothing more than the repetitious display of the sign characters under the same condition or conditions of illumination and even if the sign is in the nature of a traveling band or the like bearing the sign characters, the attractiveness of the sign is enhanced but little as there is still no more than a repetitious display of the sign characters. Furthermore, in signs of the general character mentioned the changes in the lighting effect are effected by more or less expensive flashing devices which not only increase the original cost of the sign but also consume current in the operation of the sign. Aside from the factors above mentioned there is one which no doubt possesses maximum value as a means for attracting and holding the attention of the observer, which is mystery. A sign employing a traveling band does not comprehend this factor for the reason that one readily understands that the band is driven by a suitable motor and, furthermore, the band passes in full sight of the observer. Also in the case of the successive illumination of the sign characters by different colored lights, one understands that electric light bulbs of different colors are employed. In consideration of the foregoing the present invention aims primarily to provide a sign so constructed and operating in such a manner as to utilize all of the factors above mentioned so that the sign will possess attractiveness to a maximum degree and thus serve to hold the observer's attention for a longer period of time.

Another aim of the invention is to provide a sign possessing the characteristics above mentioned which will be extremely simple in its construction, required but a minimum amount of electric current for its operation, not be likely to require repairs, and in which one sign character bearing medium may be substituted for another in a few moment's time so as to provide for frequent changing of the advertising in a manner to be displayed. In this connection the invention also aims to so construct the sign that the effects produced by the operation thereof may also be varied at will without any considerable trouble and in a short time.

In addition to the foregoing there are numerous other features and advantages possessed by the sign of the present invention and which will be hereinafter pointed out.

In the accompanying drawings:

Figure 1 is a horizontal sectional view through one form of the sign embodying the present invention;

Figure 2 is a vertical transverse sectional view on the line 2—2 of Fig. 1;

Figure 3 is a vertical sectional view on the line 3—3 of Fig. 1;

Figure 4 is a similar view on the line 4—4 of Fig. 1;

Figure 5 is a perspective view of a supporting member constituting a part of the sign;

Figure 6 is a group perspective view illustrating the relative arrangement of certain of the elements of the sign;

Figure 7 is a view in elevation of a portion of the sign band employed in the arrangement shown in the foregoing figures;

Figure 8 is a view in front elevation of the refractive light rays transmitting medium employed;

Figure 9 is a vertical sectional view on the line 9—9 of Fig. 8;

Figure 10 is a view similar to Fig. 8 illustrating another form of the refractive light rays transmitting medium;

Figure 11 is a longitudinal sectional view on the line 11—11 of Fig. 10;

Figure 12 is a view somewhat similar to Fig. 1 illustrating another arrangement of the sign elements;

Figure 13 is a view similar to Fig. 6 illustrating more clearly the arrangement shown in Fig. 12;

Figure 14 is a view in rear elevation of a portion of the color imparting medium shown in Fig. 13;

Figure 15 is a view similar to Fig. 12 illustrating another arrangement of the sign elements;

Figure 16 is a view similar to Fig. 13, illustrating more clearly the arrangement of the sign elements shown in Fig. 15;

Figure 17 is a view in elevation of a portion of the sign character bearing medium shown in Fig. 16.

The sign proper and the elements associated therewith are mounted within a casing which is preferably, although not necessarily, constructed of sheet metal, and this casing comprises a bottom 1, a rear wall 2, and end walls 3, the casing being open at its front except as will be presently explained and the said casing as a whole being substantially rectangular. While the wall 1 in the present instance is referred to as the bottom of the casing, nevertheless the casing may be disposed in upright position instead of horizontally without in any way effecting the operation of the sign. As clearly shown in Figs. 1 and 2 of the drawings, the forward marginal portions of the end walls 3 and the bottom 1 are bent back upon themselves as indicated by the numeral 4 and thence inwardly at right angles as at 5 to provide a continuous flange extending around the open front of the casing and spaced slightly inwardly of the casing. A suitable frame, indicated by the numeral 6 and of rectangular form, is disposed within the open front of the casing with its rear side resting against the flange 5, and the frame is secured in place in any suitable manner, as for example by screws 7 which are driven through the walls 1 and 3 of the casing and the overturned portions 4 of the said walls and into the corresponding edges of the frame 6. The frame 6 has its inner side rabbeted as at 8 so as to receive a transparent or translucent pane of glass or similar material, as will be presently described. The casing is provided with a top or cover 9 which is hingedly connected at 10 with the upper member of the frame 6 and which is designed to normally close the upper side of the casing, it being understood, however, that when the said top or cover 9 is swung upwardly upon its hinges 10, access may be readily had to all portions of the interior of the casing so as to permit of the substitution of one sign member for another and repair and adjustment of the parts.

In all forms of the present invention there is employed an endless traveling band of one character or another, and this band is passed about suitable upright rolls arranged within the casing and is driven through the medium of an electric motor. The band, in that form of the invention shown in Figs. 1, 2, and 6 of the drawings, is indicated by the numeral 11 and the arrangement of the rolls about which this band is passed will now be described. The numeral 12 indicates a plate of metal which is disposed upon the upper face of the bottom of the casing and which not only serves as a mounting for three of the said rolls and the driving motor, but also as a means for reinforcing or stiffening the bottom of the casing. The rolls just mentioned are indicated one by the numeral 13, another by the numeral 14, and the third by the numeral 15. As all of these rolls are substantially identical in construction a description of one will suffice for all, and also for other rolls which will be presently more specifically referred to. Each roll comprises a hollow cylindrical body 16 preferably of sheet metal, and heads 17, the heads having hub portions 18 which are exteriorly cylindrical and which are driven frictionally into the ends of the body 16, the peripheral portions of the heads extending beyond the respective hub portions 18 so as to provide flanges 19 to prevent displacement of the traveling band 11 with relation to the rolls. The heads 17 are formed axially with aligned openings 20 which receive a spindle 21, the spindle being threaded at its lower end, as indicated by the numeral 22, and having fitted upon its said end a head 23 upon which the lower one of the heads 17 of the respective roll rotatably rests. The threaded lower end of the spindle is fitted through openings formed in the plate 12 and the bottom 1 of the casing, and a nut 24 is threaded onto the said end of the spindle and is tightened to bear against the under side of the said bottom 1, the lower side of the head 23 being thus caused to bear against the upper face of the plate 12 and the spindle being in this manner rigidly secured in upright position upon the plate 12 within the casing. Inasmuch as the rolls are removably fitted onto their respective spindles 21, the rolls may be readily removed from the spindles when the top or cover of the casing has been swung to open position, thereby permitting of ready substitution of one sign band for another. The plate 12 is located at one end of the casing, and a similar plate 25 is located at the other end of the bottom of the casing and supports rolls, one indicated by the numeral 26 and the other by the numeral 27. Referring now to Fig. 1 of the drawings it will be observed that the rolls 13 and 26 are located immediately inwardly of the frame 6 at the front of the casing and in the opposite forward corners of the said casing, the roll 14 being located in the rear corner of the casing at that end at which the roll 13 is located, and the roll 15 being located also at the rear of the casing and spaced from the roll 14. The roll 27 is located near the rear of the casing at that end thereof at which the roll 26 is located, and a roll 28 occupies a position rearwardly of the roll 27 and in the same end of the casing. The roll 28 is mounted upon a floating spindle 29 to the ends of which are connected suitable bearing members which are substantially in the nature of links and which are indicated by the numeral 30. An elastic band 31 is disposed against the outer face of the adjacent end wall of the casing and has its end portions trained through openings 32 formed in the said end wall, and hooks 33 are connected to the ends of the band 31 and are detachably engaged with the link bearings 30. Due to the elasticity of the member 31, the roll 28 is, of course, yieldably held in the direction of the said end wall of the casing and it serves to tension the sign or display band 11 for the purpose of holding the same taut and also causing the same to frictionally engage the roll 15 which is the drive roll for the band. The band 11 is passed across the front of the casing immediately behind the frame 6 and about the rolls 13 and 26, it being passed also rearwardly and about the rolls 14 and 27, respectively, and from the roll 14 being passed about the roll 28 and finally about the roll 15. As the roll 15 is spaced a considerable distance from the rolls 27 and 28, the back and forth passage of the band in passing the same about these rolls provides for the employment of a band of maximum length. In order that the roll 15 may be rotated so as to impart travel to the band 11 and thereby cause the band to pass continuously before the front of the casing, an electric motor indicated in general by the numeral 34 is mounted upon suitable posts 35 upon the plate 12 and has its shaft provided with a pulley 36 about which is passed a coiled wire spring belt 37, the said belt being trained also about a pulley 38 carried by the lower head of the roll 15.

Electric light sockets 39 of the double ended type are mounted within the casing and are preferably substantially equidistantly spaced from each other and from the end walls of the casing and fitted into these sockets are electric light bulbs 40 which are three in number and are designed to constitute solely the source of light rays for the illumination of the sign. A fourth bulb, indicated by the numeral 41, is fitted in the remaining socket and is in circuit with the motor 34, this bulb serving primarily as a resistance element in the said circuit and secondarily as a source of illumination. It will be understood, of course, that by substituting one bulb 41 for another, the resistance may be varied so as to regulate the speed at which the motor is to operate, and thus the speed at which the sign or display band 11 is to travel may be readily varied by the one using the sign. Electric current is supplied to the sockets 39 and the motor by means of a suitable conductor cord 42 of the ordinary type provided with the usual plug 43 for connection with a lamp socket.

In this form of the invention the sign characters are exhibited or displayed through a refractive light rays transmitting medium which is in the nature of a pane 44 of glass or other suitable material mounted within the frame 6. The pane 44 is preferably of clear glass and one face thereof is faceted by the formation therein of a plurality of substantially pyramidal depressions 45, the facets resulting from the formation of these depressions being indicated by the numeral 46. The pane is so cut that the sides of the squares defining the open sides of the depressions 45 will be non-parallel to the edges of the pane and preferably they will be at an angle of 45° to the said edges as clearly shown in Fig. 8 of the drawings, as I have found that by thus cutting the pane, the best results may be obtained. While as stated, the depressions 45 are substantially pyramidal and the formation of each depression resulting in four of the facets 46, nevertheless it will be understood that these depressions may take some other form which will increase or diminish the number of the facets 46 or vary their relative arrangement. Also it will be apparent that inasmuch as the depressions are arranged side by side, the faceted face of the pane 44 may be considered in a sense as provided with protuberances providing facets and I, therefore, consider that the description of the pane as a faceted light rays transmitting medium as covering the employment of a pane one or both faces of which may have protuberances thereon or depressions therein providing facets. As will be presently made evident, the object of the pane 44 is to refract light rays passing therethrough and, therefore, when I refer in the specification and in the claims to a refractive light rays transmitting medium, I mean any light rays transmitting medium possessing characteristics rendering it refractive. For example, I may make use of a pane of clear glass such as shown in Figs. 10 and 11 of the drawings and indicated by the numeral 47, and which pane is formed in its opposite faces with a plurality of symmetrically arranged circular depressions 48, the depressions in one face being arranged in staggered relation to the corresponding depressions in the other face of the pane and the diameters of the depressions being greater than the width of the spaces between the depressions so that the circles defining the depressions in one face of the pane will extend into the circles defining the depression in the other face of the pane. This form of pane also discloses the formation of depressions in or protuberances upon both faces of the pane so that I consider that I am also entitled to make use of any display pane provided upon or in either or both of its faces with protuberances or depressions of any form or arrangement capable of rendering the pane refractive. In the use of the pane 44, the same is arrangd in the frame 6 in such a manner that the plane or smooth face of the pane 44 will be presented inwardly and the faceted face will be presented outwardly.

Also in this form of the invention the band 11 carries or is provided with the sign characters or other advertising matter to be displayed and this band, in the present instance, is preferably in the nature of a band of black or similarly paper, or it may be or any other opaque material. For example, the band may be of paper cloth, rubber cloth, silk photographic cloth, linen, rollershade cloth, or in fact, as stated above, any material suitable for the purpose and opaque in character. The sign characters are produced by punching holes 49 in the band to form the outlines of the characters and these holes may be made by the use of an ordinary paper punch or in any other manner desired, and inasmuch as they may be so conveniently formed by the use of an ordinary paper punch which is well-known implement, it is obvious that even an inexperienced person may readily make various advertising matter by punching out the characters desired in an endless strip of the material employed in the manufacture of the band. Furthermore, I have found that the outlines do not require to be perfectly regular as slight deviations from a straight or curved line are corrected in the operation of the sign or are at least rendered substantially indistinguishable. In the operation of the sign the sign band 11 is caused to travel from right to left so that letters of a word, for example, appear at the right hand end of the sign front (facing the sign) in the order in which they are arranged in the spelling of the word. As that stretch of the sign band which extends between the rolls 13 and 26, passes immediately behind the refractive light rays transmitting pane 44 and between the said pane and the source of illumination comprising the lamps 40 and 41, the only light rays reaching the said pane must pass through the openings 49 in the sign band.

In order that the best results may be obtained I make use of a color imparting medium for the purpose of variously tinting the light rays before they pass through the openings 49 and this medium is in the nature of a pane 50 which is preferably in the nature of what is commercially known as opal glass, the pane being therefore translucent as distinguished from transparent. This pane is supported at its end edges in suitable clips 51 mounted upon uprights 52 supported in a manner similar to the spindles 21 and located one close to the roll 13 and the other close to the roll 26, the pane being positioned immediately rearwardly of the stretch of the sign band passing between the said rolls 13 and 26 and, consequently, between the said stretch of the sign band and the source of illumination comprising the electric lamps. A clear understanding of this relative arrangement of the elements above referred to may be had by reference to Fig. 6 of the drawings. Upon one face of the pane 50 there are daubed or otherwise applied inks or similar fluids of various colors so as to form the color fields 53 of various outlines. In order to prevent the escape of light rays over the upper edge and beneath the under edge of the pane 50, the said edges of the pane are preferably striped with black paint as indicated by the numeral 54 or are provided with a suitable opaque binding or in any other suitable manner rendered opaque. The pane 50 is preferably, as stated above, of opal glass although it may be in the nature of translucent paper, frosted glass, cloth, clear glass frosted on one side and colored on the other, or any translucent material colored in a manner to variously tint the light rays passing therethrough.

In the use of this form of the invention, the sign band 11 will be caused to travel continuously, and as the openings 49 pass in front of the variously colored pane 50, the tinted light rays passing through this pane will pass also through the openings 49, and due to the variously colored nature of the pane 50, the light rays passing through any one of the openings will, of course, have their tint continuously changed from one color to another, as well as to various shades of one color. The light rays after passing through the openings 49 will, of course, strike and pass through the pane 44 and due to the faceted or refractive nature of this pane, will be refracted in a manner to produce a highly interesting and attractive result.

For example, in the use of the particular form of pane shown in Figures 8 and 9 of the drawings, the sign characters as displayed through this pane will appear to be substantially solid and will have a shimmering scintillating appearance as though viewed through intense heat. Furthermore, the light rays passing through each opening 49 and striking the facets 46 will, due to the prismatic arrangement of the facets, become additionally variously tinted. Also a group of the light rays passing through a single one of the openings will be refracted in such a manner that viewed through the pane 44, it will appear as though there are in fact five groups of light rays, each of a different color. Furthermore, due to the constant movement of the sign band, each group of light rays viewed through the pane 44 appears to be continuously revolving so that each letter or character of the sign appears to be made up of countless jewels each revolving and constantly going through endless color changes. Another effect produced is that of apparent increase in size of the characters when viewed through the pane 44 for in the actual use of the sign each character will appear approximately twice the height and width of the character as defined by the openings 49 in the sign band 11. In the use of the glass pane 47 shown in Figs. 10 and 11, the group light rays passing through the openings 49 in the sign band appear as equilateral triangles, and the sign characters as a whole are displayed with a peculiar flashing effect.

Figures 12, 13 and 14 illustrate a modified arrangement of the invention. In these figures the numeral 55 indicates a pane of opal glass; the numeral 56 indicated the traveling sign band in which the characters are defined by the perforations heretofore described; and, the numerals 57 and 58 indicate, respectively the color imparting medium and source of illumination. In this form of the invention the color imparting medium 57 is in the nature of a pane of opal glass provided upon its inner face, or in other words, the face which is presented toward the source of illumination 58, with a number of stripes indicated by the numeral 59, the stripes being made by the application of a suitable transparent coloring fluid or ink. The stripes 59 extend along undulating lines and as a consequence the sign characters when viewed in the operation of the sign appear to rise and fall.

Figures 15, 16 and 17 illustrate a further modification of the invention and in these figures the numeral 60 indicates a pane corresponding to the pane 44; the numeral 61 indicates a pane of opaque material or of transparent material having an opaque coating which is omitted throughout portions of its area, however, to form the letters or characters of the sign as indicated by the numeral 62; the numeral 63 indicates a raveling band which is of translucent or substantially translucent material having color fields 64 applied thereto and corresponding to the color fields 53; and, the numeral 65 indicates the source of illumination.

In addition to the effects heretofore described as produced by the operation of the sign embodying the present invention, each sign character appears in rather bold outline and back of this outline there appear other outlines of the character which successively become less distinct.

Having thus described the invention, what is claimed as new is:

1. In a sign of the class described, a source of illumination, a refractive light rays transmitting medium, a translucent light rays transmitting medium arranged between the source of illumination and the refractive light rays transmitting medium, and a moving sign medium having sign characters defined by series of perforations therein, the sign medium being arranged to travel between the translucent light rays transmitting medium and the refractive light rays transmitting medium.

2. In a sign of the class described, a source of illumination, a refractive light rays transmitting medium, a color imparting medium, and a sign medium arranged to travel between the color imparting medium and the refractive light rays transmitting medium and having sign characters defined by series of perforations therein.

3. In a sign of the class described, a source of illumination, a refractive light rays transmitting medium, a translucent pane having color fields thereon variously arranged and of different colors, the said pane being located between the source of illumination and the refractive light rays transmitting medium, and a sign medium arranged to travel between the said translucent pane and the refractive light rays transmitting medium and having sign characters defined by series of perforations formed therein.

4. In a sign of the class described, a source of illumination, a refractive light rays transmitting medium, a color imparting medium located between the source of illumination and the refractive light rays transmitting medium and comprising a translucent pane having nonsymmetric fields of different colors and a moving sign medium having light rays transmitting portions defining the sign characters and moving in a path between the color imparting medium and the refractive light rays transmitting medium.

5. In a sign of the class described, a source of illumination, a refractive light ray transmitting medium comprising a light ray transmitting pane formed in one face with a plurality of substantially pyramidal depressions each providing a plurality of facets, and a moving sign medium having light ray transmitting portions defining sign characters and located between the said source of illumination and the refractive light ray transmitting medium, the sides of the depressions being disposed non-parallel to the path of movement of the said sign medium.

6. In a sign of the class described, a source of illumination, a refractive light ray transmitting medium comprising a light ray transmitting pane formed in one face with a plurality of substantially pyramidal depressions, each providing a plurality of facets, and a moving sign medium having light ray transmitting portions defining the sign characters and located between the said source of illumination and the other face of the refractive light ray transmitting medium.

7. In a sign of the character described, a source of illumination, a faceted refractive light rays transmitting medium, a color imparting light rays transmitting medium, a medium having light rays transmitting portions defining the sign characters, said mediums being arranged in lapping relation in advance of the source of illumination, and means for effecting a relative movement between the source of light and one medium.

8. In a sign of the class described, a source of illumination, a refractive light ray transmitting medium having depressions providing a plurality of facets, a sign medium having light ray transmitting portions defining the sign characters and located between the source of illumination and the light ray transmitting medium, a color imparting medium located between the source of illumination and the sign medium, and means for effecting a relative movement between one of the mediums and the source of illumination.

9. In a sign of the class described, a source of illumination, a faceted refractive light rays transmitting medium, a color imparting medium comprising a translucent sheet having light transmitting fields of different colors, the said sheet being located between the source of illumination and the refractive light transmitting medium, a medium having light rays transmitting portions defining the sign characters and located between the color imparting medium and the refractive light rays transmitting medium, and means for effecting a relative movement between one of the mediums and the source of illumination.

10. In a sign of the class described, a source of illumination, a faceted refractive light rays transmitting medium, a light rays diffusing medium located between the source of illumination and the refractive light rays transmitting medium, a medium having light rays transmitting portions defining the sign characters and located between the rays diffusing medium and the refractive light rays transmitting medium, and means for effecting a relative movement between one of the mediums and the source of light.

11. In a sign of the class described, a source of illumination, a faceted refractive light transmitting medium, a color imparting medium located between the source of illumination and the refractive light rays transmitting medium, and comprising a translucent pane having different colored fields promiscuously arranged thereon, a medium having light rays transmitting portions defining the sign characters and located between the color imparting medium and the refractive light rays transmitting medium, and means for effecting a relative movement between one of the mediums and the source of illumination.

12. In a sign of the character described, a source of illumination, a faceted refractive light rays transmitting medium, a light rays diffusing medium, a medium having light rays transmitting portions defining the sign characters, said mediums being arranged in lapping relation in advance of the source of illumination, and means for effecting a relative movement between the source of light and one medium.

13. In a sign of the character described, a source of illumination, a light rays diffusing medium located in advance of the source of light, a faceted refractive light rays transmitting medium, a medium having light rays transmitting portions defining the sign characters, the last two named mediums being disposed in lapping relation in advance of the light rays diffusing medium and means for effecting a relative movement between one medium and the source of light.

In testimony whereof I affix my signature.

RICHARD M. CRAIG. [L. S.]